(12) United States Patent
Sundby (10) Patent No.: US 12,429,121 B2
(45) Date of Patent: Sep. 30, 2025

(54) REDUCING POSITION REPEATABILITY ERROR IN LINEAR MOTION SYSTEMS

(71) Applicant: Translarity, Inc., Fremont, CA (US)

(72) Inventor: Ray Sundby, Fremont, CA (US)

( * ) Notice: Subject to any disclaimer, the term of this patent is extended or adjusted under 35 U.S.C. 154(b) by 309 days.

(21) Appl. No.: 18/101,104

(22) Filed: Jan. 24, 2023

(65) Prior Publication Data

US 2023/0243405 A1    Aug. 3, 2023

Related U.S. Application Data

(60) Provisional application No. 63/302,352, filed on Jan. 24, 2022.

(51) Int. Cl.
*F16H 25/24* (2006.01)
*F16H 25/22* (2006.01)

(52) U.S. Cl.
CPC ......... *F16H 25/24* (2013.01); *F16H 25/2204* (2013.01); *F16H 2025/2445* (2013.01)

(58) Field of Classification Search
CPC ...... F16H 25/2204; F16H 25/24; F16H 25/22; F16H 25/2418; F16H 2025/2075; F16H 2025/2081; F16H 2025/204
USPC ......... 74/89.23, 89.36, 89.32, 89.42, 424.71, 74/441, 424.81; 269/60, 55, 71
See application file for complete search history.

(56) References Cited

U.S. PATENT DOCUMENTS

| | | | | |
|---|---|---|---|---|
| 2,903,902 A | * | 9/1959 | Berggren | B23Q 5/56 74/89.38 |
| 3,464,283 A | * | 9/1969 | Miller | B23Q 5/408 74/89.36 |
| 3,703,835 A | * | 11/1972 | O'Connor | F16H 25/2006 74/441 |
| 3,728,903 A | * | 4/1973 | Haller | F16H 25/2409 74/89.36 |
| 3,889,544 A | * | 6/1975 | Suss | F16C 29/04 74/89.36 |
| 4,013,280 A | * | 3/1977 | Chitayat | F16C 29/041 248/913 |
| 4,372,223 A | * | 2/1983 | Iwatani | F16M 11/045 74/89.33 |

(Continued)

FOREIGN PATENT DOCUMENTS

JP    59115140 A   *   7/1984   ............... B23Q 1/58

*Primary Examiner* — Jason L Vaughan
(74) *Attorney, Agent, or Firm* — Shapiro IP Law; Joseph Shapiro (57) ABSTRACT

A linear movement system may comprise a base having two parallel rails, a table comprising two rail bearings configured to move in one dimension relative to the table and along the rails, and two force stabilization components secured to the table and configured to exert and aggregate rotational force on the table relative to the base. The force stabilization components may each comprise a fixed block secured to the table and a free-moving block in contact with the fixed block through a spring configured to push the fixed block and the free-moving block apart so that the free-moving block is in contact with one of the rails and pushes the rail away from the table location at which the fixed block is secured. This system may provide an aggregate rotational force that is stronger than other rotational forces resulting from mechanical imperfections in the system, thereby guaranteeing that the rotational force is always in the same direction.

13 Claims, 10 Drawing Sheets

(56) References Cited

U.S. PATENT DOCUMENTS

| | | | | |
|---|---|---|---|---|
| 5,642,941 | A * | 7/1997 | Mouezy | B23Q 1/40 |
| | | | | 384/57 |
| 6,267,021 | B1 * | 7/2001 | Mauro | F16H 25/2009 |
| | | | | 74/89.42 |
| 8,973,453 | B2 * | 3/2015 | Fukano | F16H 25/24 |
| | | | | 74/89.32 |
| 2002/0164095 | A1 * | 11/2002 | Nagai | F16C 29/04 |
| | | | | 74/424.81 |
| 2003/0066367 | A1 * | 4/2003 | Liao | B23Q 5/40 |
| | | | | 74/89.36 |

* cited by examiner

Prior Art

Prior Art

FIG. 3

Prior Art

FIG. 4

Prior Art

REDUCING POSITION REPEATABILITY ERROR IN LINEAR MOTION SYSTEMS

BACKGROUND OF THE INVENTION

Figure 1:
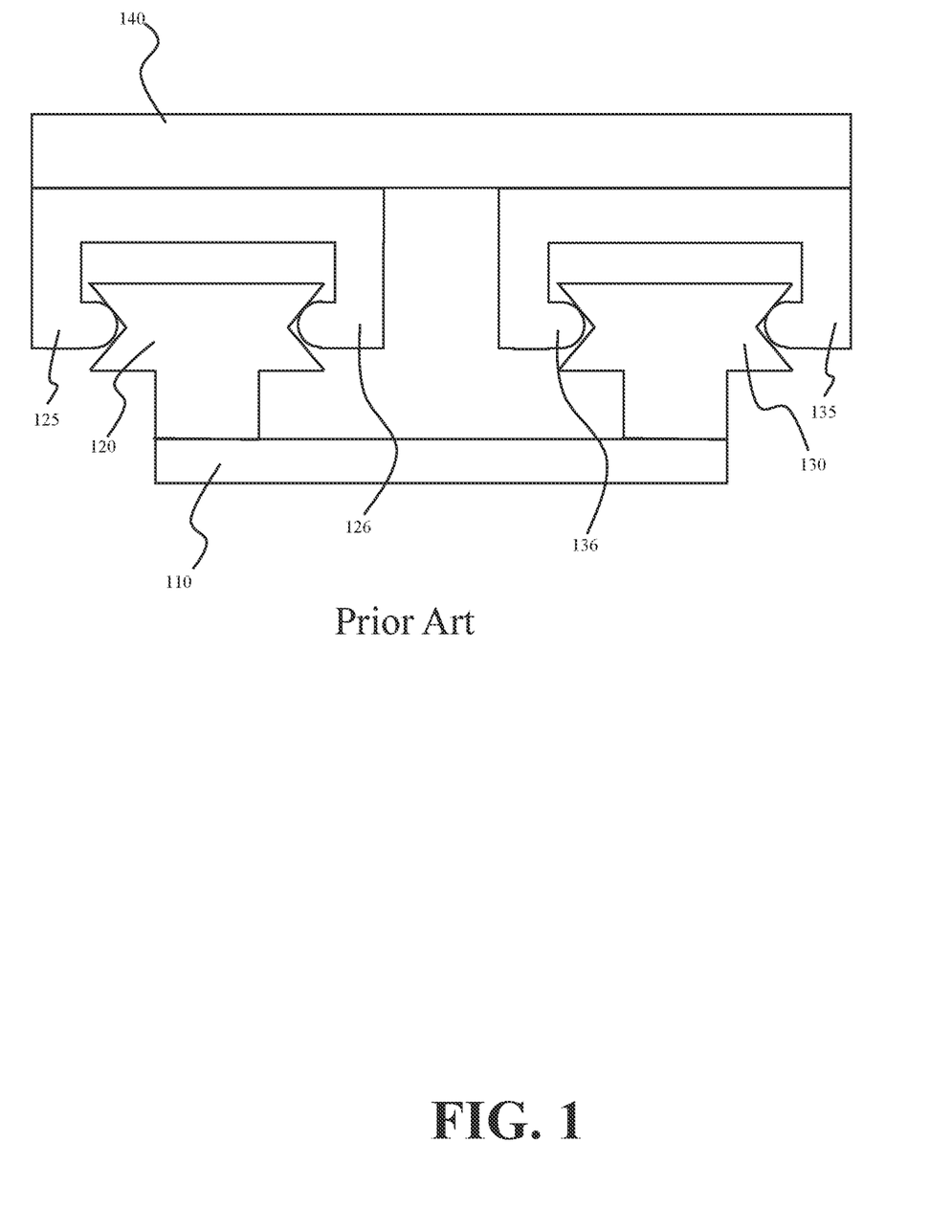
FIG. 1 illustrates a cross-sectional view a prior art system for a 1-dimensional movement of a mechanical device.
Figure 2:
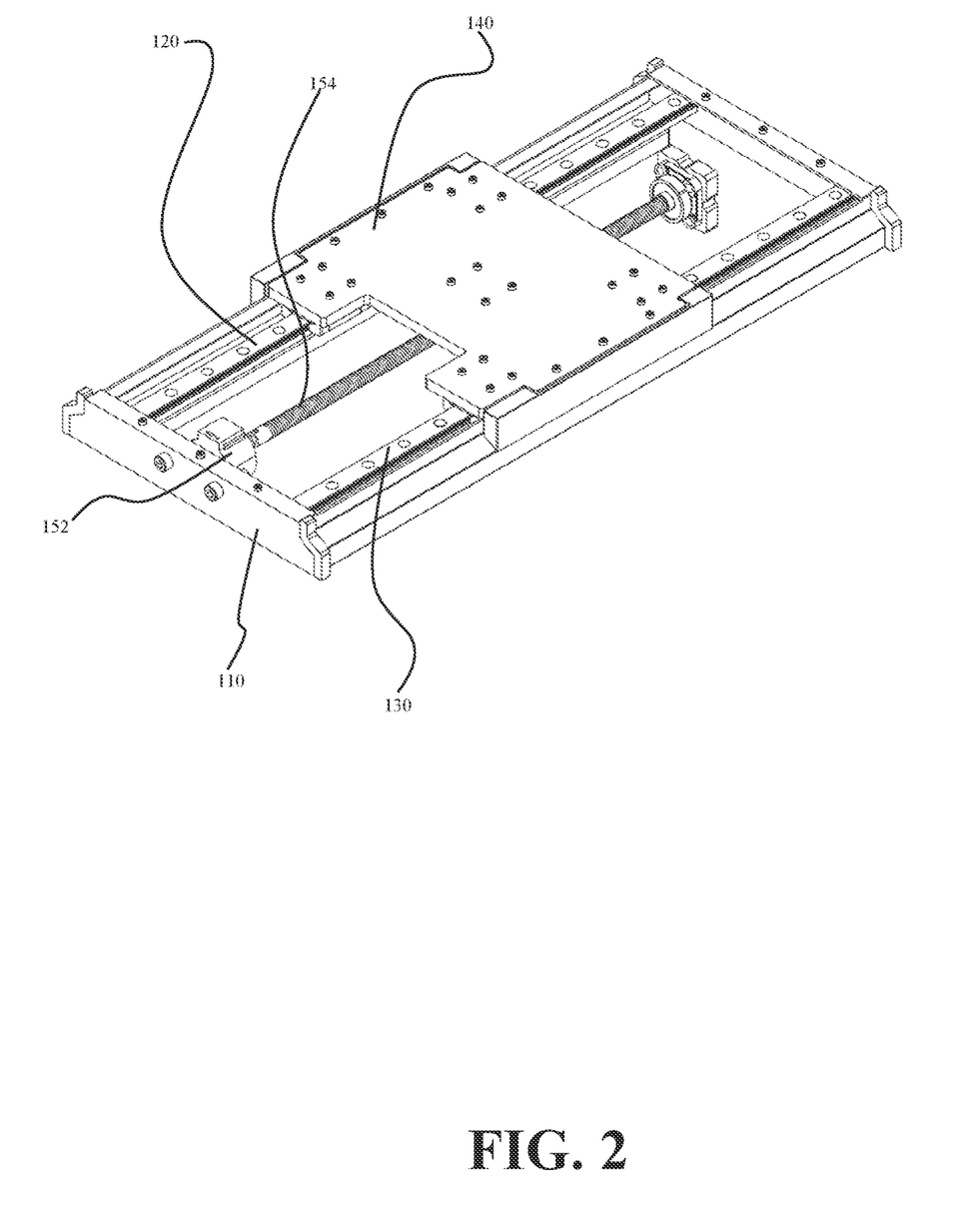
FIG. 2 illustrates a system for a 1-dimensional movement of a mechanical device.
Figure 3:
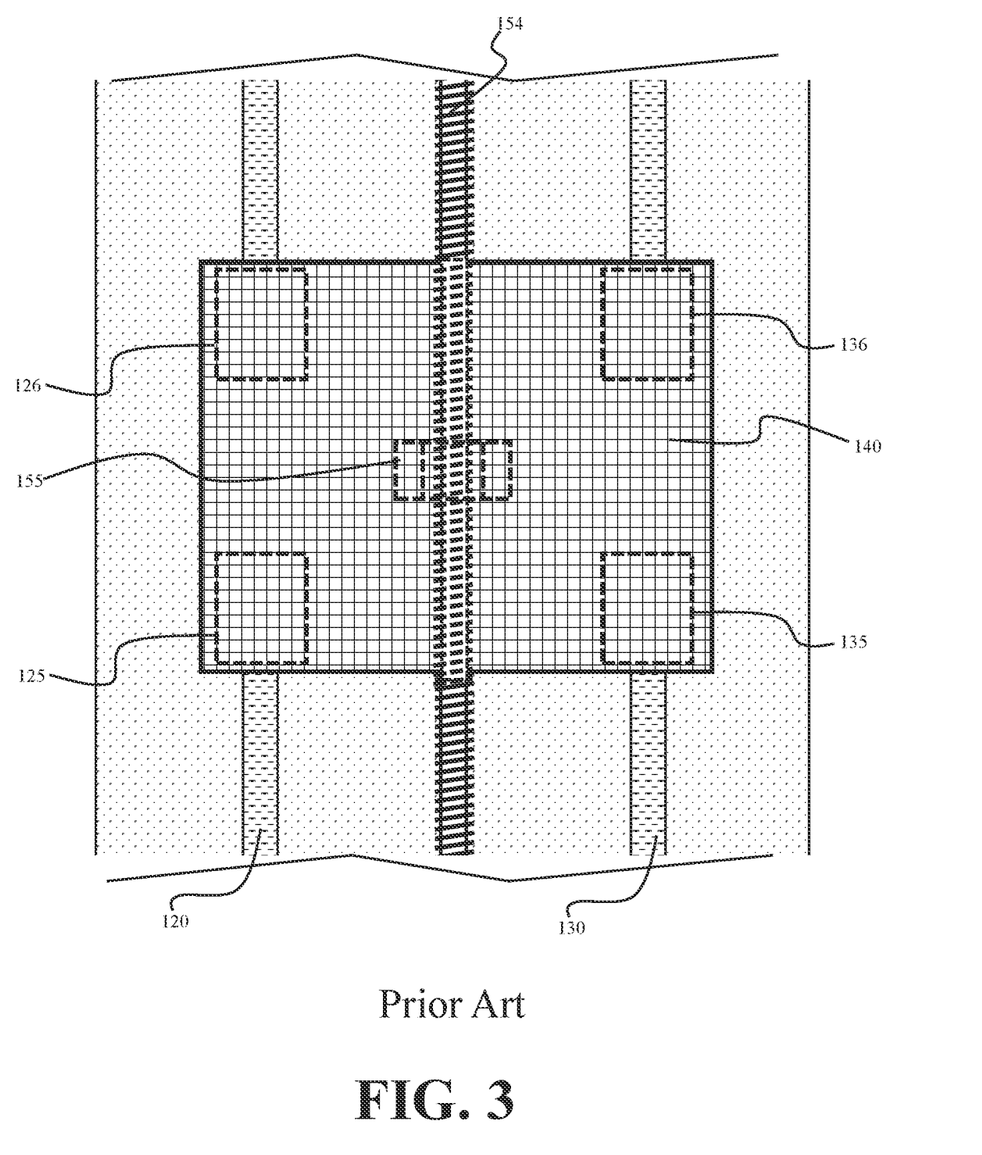
FIG. 3 illustrates a top-down view of a prior art system for a 1-dimensional movement of a mechanical device.

FIG. 2 shows a system for 1-dimensional movement of a mechanical device. FIG. 1 shows a cross-sectional view of the same system and FIG. 3 shows a top-down view of the system. The system comprises a base 110; a first rail 120 secured to the base 110; a second rail 130 secured to the base 110 and parallel to the first rail 120; a table 140 configured to be in mechanical contact with and to move along the first rail 120 and the second rail 130; a linear motion actuator secured to the base 110 and additionally secured to the table 140 for moving the table 140 along the first rail 120 and the second rail 130, and thereby moving the table 140 relative to the first rail 120, second rail 130, and the base 110.

In one embodiment, the linear drive actuator may be a ball screw 154 controlled by a servomotor 152. In this embodiment, the ball nut 155 for the ball screw 154 may be secured to the table 140 and the ball screw 154 may be secured to the servomotor 152, which may be secured to the base 110 or otherwise in a fixed position relative to the base 110.

The table 140 may be in mechanical contact with the first rail 120 and the second rail 130 through two rail bearings, 125 and 126 respectively, configured to mechanically interface with and move along the first rail 120, and two additional rail bearings, 135 and 136 respectively, configured to mechanically interface with and move along the second rail 130.

Although the disclosure herein focuses on a ball screw 154 as an exemplary embodiment, the invention described herein may be analogously applied to systems using other types of linear actuator systems.

Although this system is useful and effective for measured/controlled movements of the table along the rails (by measuring/tracking/controlling rotations of the ball screw), it has limitations. One of these limitations is the well-known phenomenon of ball screw backlash, which occurs because of non-zero clearance between ball bearing elements and the screw and nut tracks. Although numerous systems have been devised to mitigate backlash, it remains a problem in problem domains with tight tolerance requirements and high sensitivity to movement and accuracy.

A second limitation is non-repeatability resulting from table rotation that occurs because the four rail bearings have non-uniform friction characteristics. Notwithstanding efforts to manufacture and maintain rail bearings to have uniform properties, highly sensitive problem domains inevitably reveal that the rail bearings are non-uniform. Such non-uniformity results in table rotation around a virtual vertical axis running through the ball nut. Such table rotation results in non-repeatability and inaccuracy. Rotation occurs because of non-zero distances between the mechanical components of the system or from other mechanical imperfections in the system.

A third limitation is thermal expansion. During use, as the ball screw is repeatedly actuated in different directions to move the ball nut (and whatever is secured to the ball nut) back and forth, the ball screw, ball nut, and/or other components may heat up and undergo thermal expansion. This phenomenon may inject further error into the system because the distance of linear movement is difficult (likely impossible) to measure when the ball screw, ball nut, and/or other components are expanding and contracting. Using a rotary encoder on the ball screw motor will fail because the rotations-per-linear-movement factor will vary based on thermal expansion/contraction of the ball screw, ball nut, and/or other components. A linear encoder may be used as an alternative to a rotary encoder, but using a linear encoder to measure linear movement may also fail if the linear encoder (e.g., the sensor and/or scale) is also affected by thermal expansion/contraction.

Backlash, rotation non-repeatability, and thermal expansion error all prevent or hinder accurate and precise position measurements in single- or multi-dimension stage movement systems as described herein.

Figure 4:
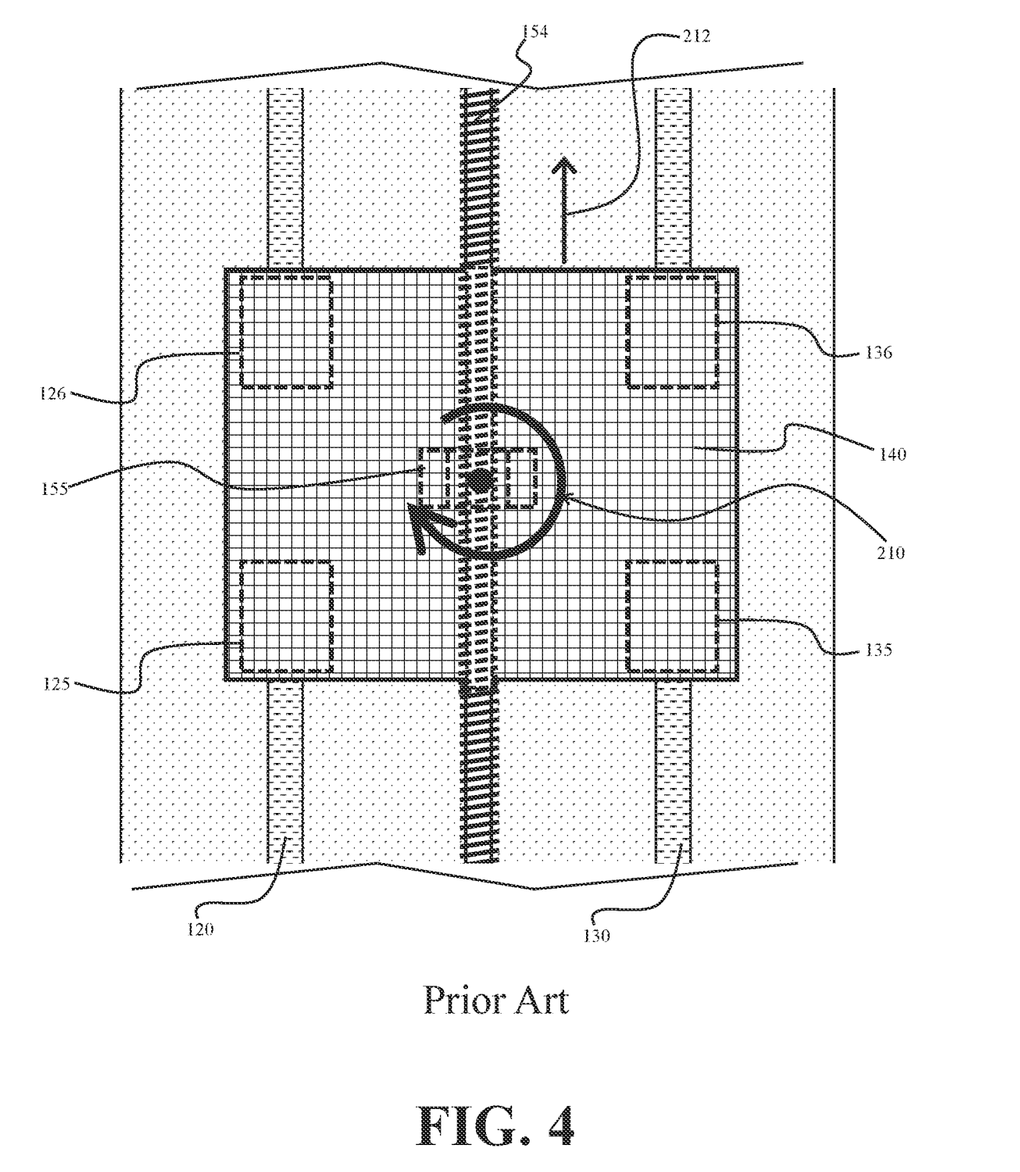
FIG. 4 illustrates a top-down view of a prior art system for a 1-dimensional movement of a mechanical device with the rotational force exerted on the table.
Figure 5:
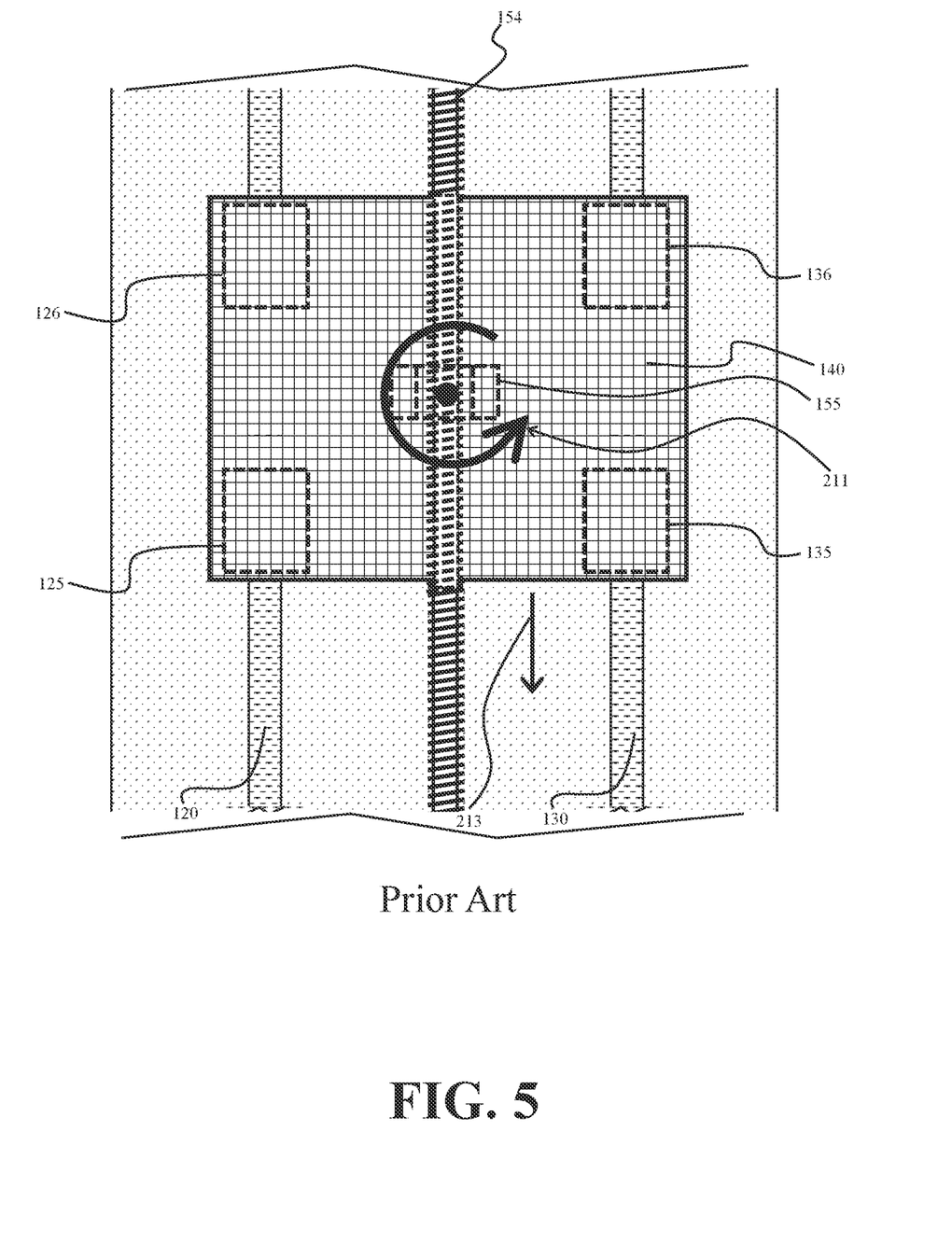
FIG. 5 illustrates a top-down view of a prior art system for a 1-dimensional movement of a mechanical device with the rotational force exerted on the table.

FIG. 4 shows the rotational force 210 that results when ball screw 154 is rotated to move table 140 in direction 212 if rail bearings 125, 126, and 136 have uniform friction properties, and rail bearing 135 has greater friction than rail bearings 125, 126, and 136. However, as shown in FIG. 5, when ball screw 154 is rotated in the opposite direction to move table 140 in direction 213, the rotational force 211 is opposite the rotational force 210. Regardless of the relative friction properties of the four rail bearings, the net result is frequently, if not virtually always, a rotational force that changes directions based on the direction of movement by the linear motion actuator.

Empirical evidence (corroborated by theory) shows that the result of repeated movements of table 140 in opposite directions (e.g., directions 212 and 213) results in non-repeatability and inaccuracy of single-dimensional and multi-dimensional location measurements/predictions. It should be noted that, even in a single-dimensional system (i.e., a system designed to move a table back and forth in one dimension, e.g., along the length of ball screw 154), the rotational forces from non-uniformity among the friction characteristics of rail bearings 125, 126, 135, and 136 may, and often do, result in two-dimensional and/or three-dimensional displacement of some or all points (except, perhaps, the rotational center) of the table.

For some applications, the non-repeatability and inaccuracy resulting from the rotational forces described above is acceptable because such applications are not sensitive to such non-repeatability and inaccuracy. But for other applications this non-repeatability and inaccuracy is unacceptable, and this system is therefore too crude. What is needed is an improved system that mitigates or eliminates the non-repeatability and inaccuracy from repeated changes in rotational forces on the table.

BRIEF SUMMARY OF THE INVENTION

A system for mitigating position repeatability error in a linear motion system comprising a base, two rails, a ball screw, a corresponding ball nut, a table, and at least one force stabilization component which may be secured to the table in such a way that the force stabilization component exerts a force on an associated rail. The force exerted on the rail tends to push the table location where the force stabilization component is secured to the table away from the rail. A second force stabilization component may be secured to the table at a location opposite the first force stabilization component along the second rail; the second force stabilization component may exert a force on the second rail that tends to push the table location where the force stabilization component is secured to the table away from the second rail. If the forces exerted by the force stabilization component(s) is sufficiently strong, this system will guarantee that the direction of the net rotational forces exerted on the table relative to the base remains constant regardless of the direction in which table is moved along the rails.

DETAILED DESCRIPTION OF THE INVENTION

This application claims priority to U.S. Provisional Application No. 63/302,352, titled "REDUCING POSITION REPEATABILITY ERROR IN LINEAR MOTION SYSTEMS," and filed on Jan. 24, 2022, and which is incorporated herein by reference in its entirety.

Table of Reference Numbers from Drawings:

The following table is for convenience only and should not be construed to supersede any potentially inconsistent disclosure herein.

| Reference Number | Description |
| --- | --- |
| 100 | linear motion system |
| 110 | base |
| 120 | first rail |
| 125 | rail bearing |
| 126 | rail bearing |
| 130 | second rail |
| 135 | rail bearing |
| 136 | rail bearing |
| 140 | stage table |
| 150 | linear drive actuator |
| 152 | servomotor |
| 154 | ball screw |
| 155 | nut (for ball screw) |
| 160 | force exerted on rail |
| 210 | rotational force |
| 211 | rotational force |

-continued

| Reference Number | Description |
| --- | --- |
| 212 | table movement direction |
| 213 | table movement direction |
| 240 | modified stage table |
| 260 | force stabilization component |
| 262 | roller |
| 263a | contact point |
| 263b | axis |
| 264a-b | springs |
| 266a-b | bolts |
| 267 | secured block |
| 268a-c | securement screws |
| 269 | free block |
| 270 | force stabilization component |
| 272 | roller |
| 273a | contact point |
| 273b | axis |
| 274a-b | springs |
| 276a-b | bolts |
| 277 | secured block |
| 278a-c | securement screws |
| 279 | free block |
| 290 | rotational force |
| 291a-b | free-movement channels |

An improved linear motion system and apparatus are disclosed as described herein below.

Repeatability/Predictability of Rotational Error

Figure 6A:
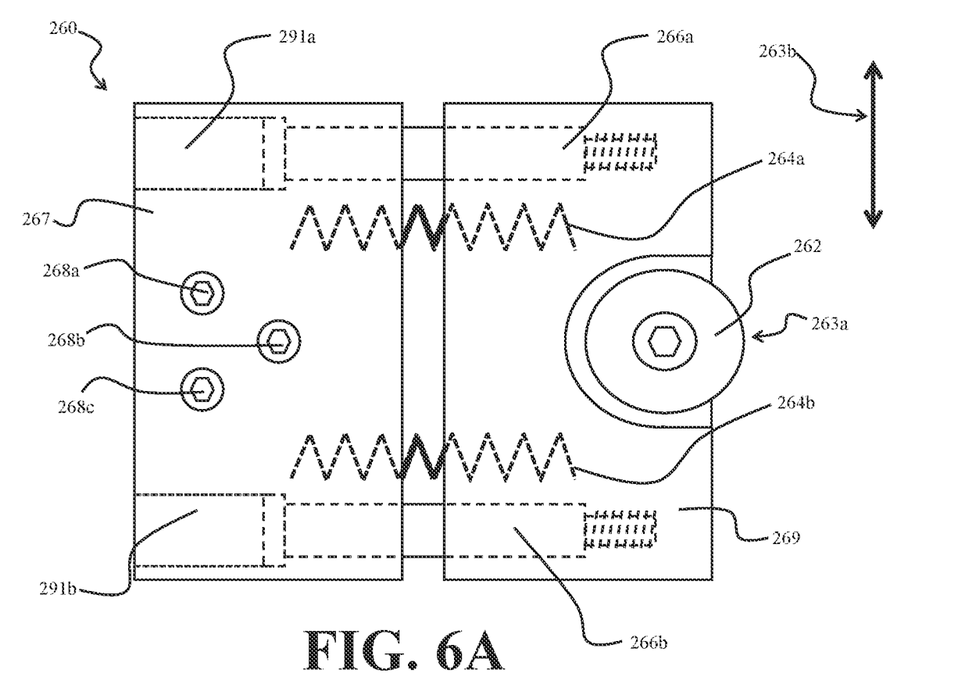
FIG. 6A shows an x-ray view of an exemplary force stabilization component.
Figure 6B:
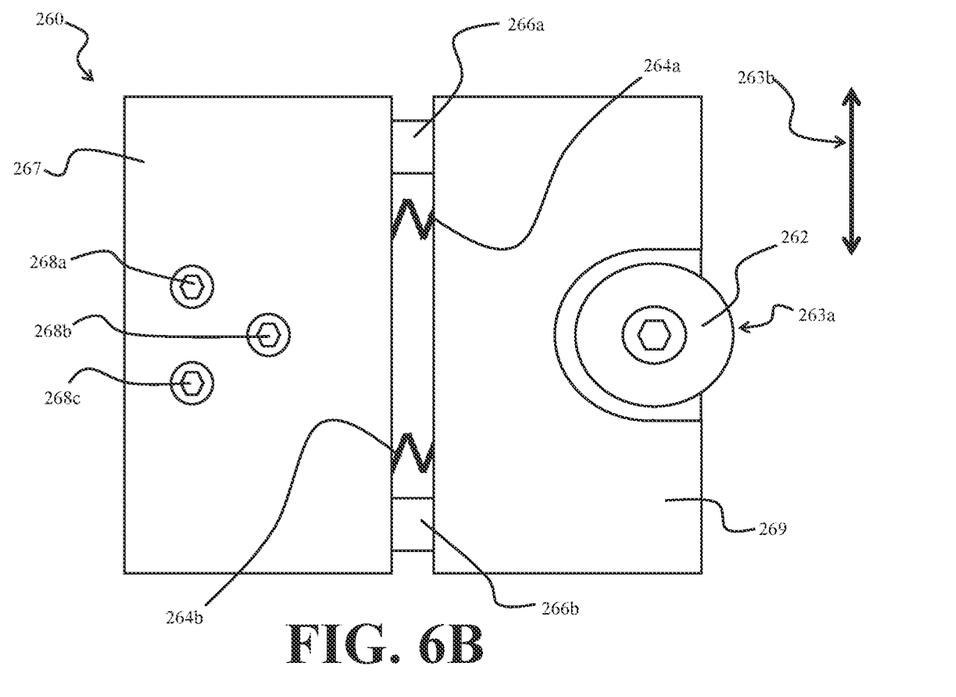
FIG. 6B shows an exemplary view of a force stabilization component.
Figure 6C:
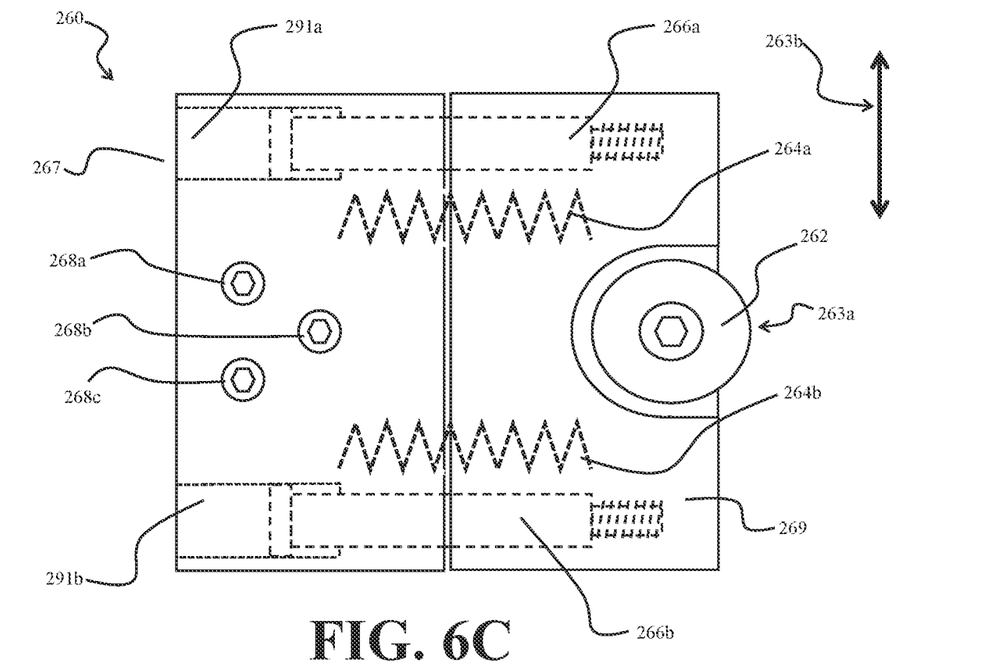
FIG. 6C shows an x-ray view of an exemplary compressed force stabilization component.
Figure 6D:
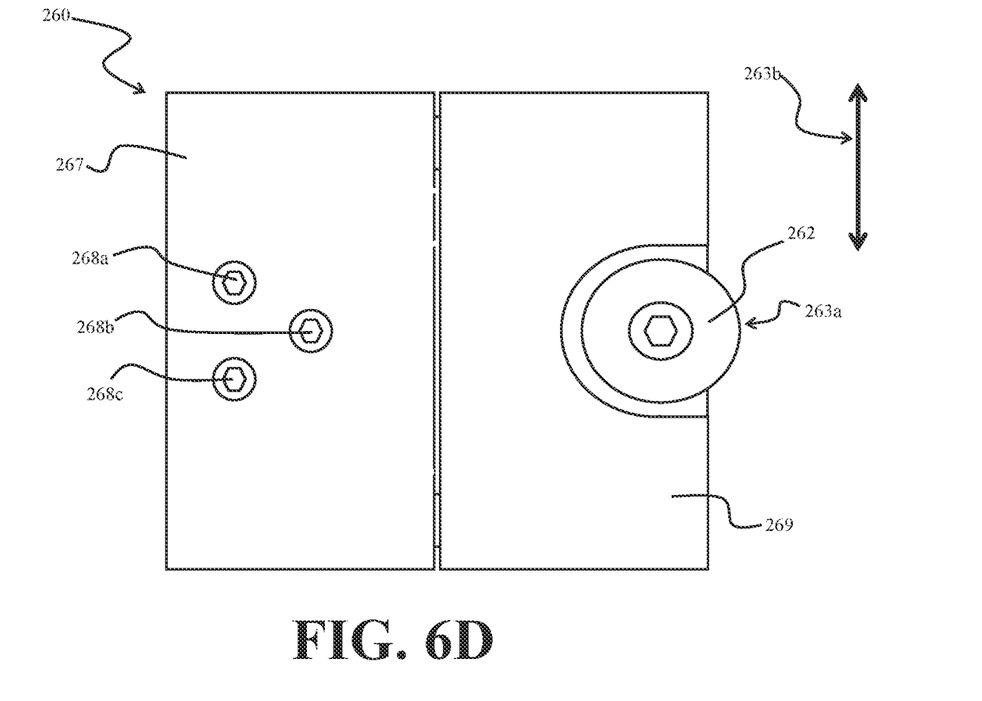
FIG. 6D shows an exemplary view of compressed force stabilization component.
Figure 7:
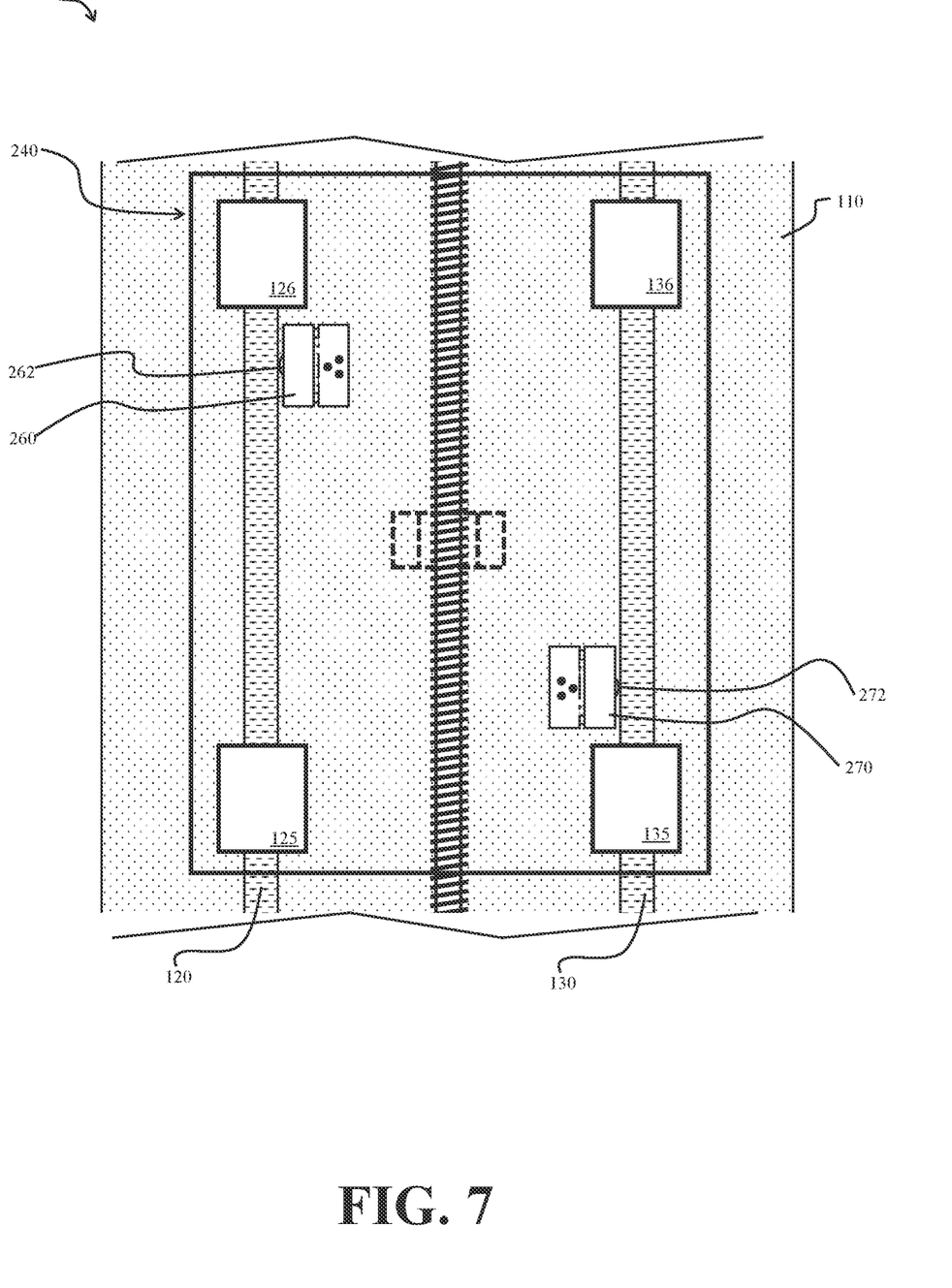
FIG. 7 shows illustrates a top-down view of an exemplary system for 1-dimensional movement incorporating two force stabilization components.
Figure 8A:
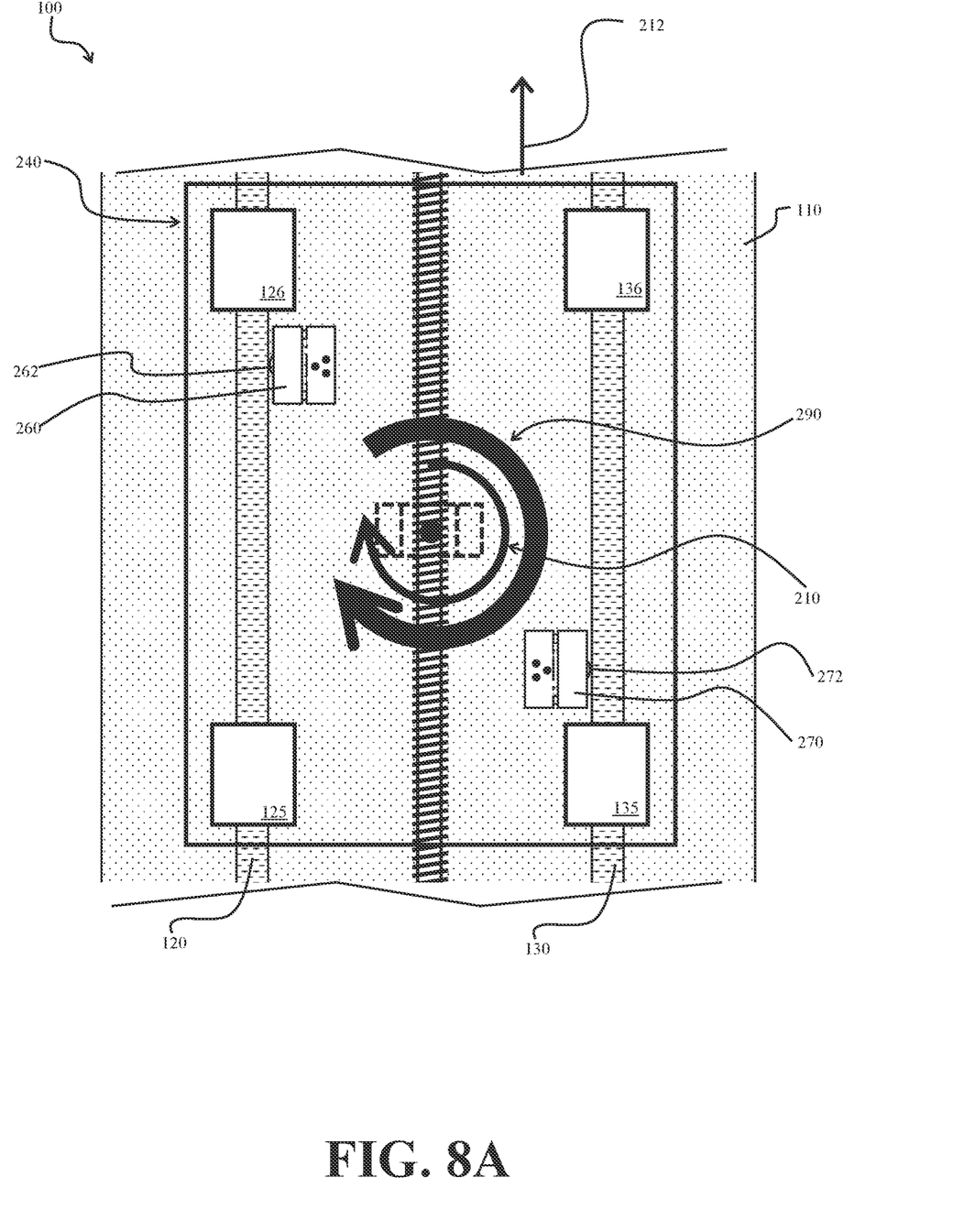
FIG. 8A shows a top-down view of an exemplary system for 1-dimensional movement incorporating two force stabilization components, and additionally showing the rotational forces exerted on the table.
Figure 8B:
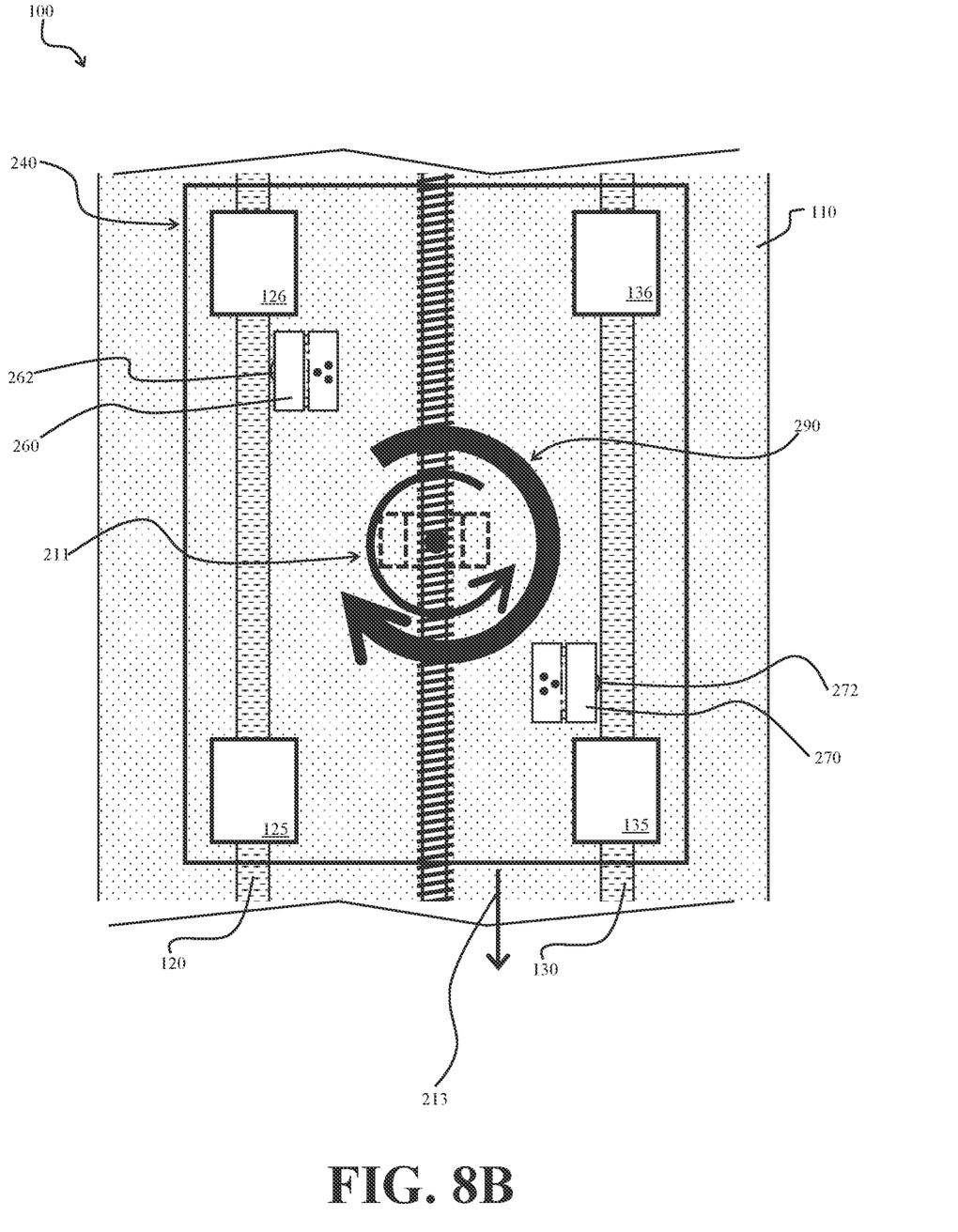
FIG. 8B shows a top-down view of an exemplary system for 1-dimensional movement incorporating two force stabilization components, and additionally showing the rotational forces exerted on the table.

FIGS. 6, 7, 8A, and 8B are each top-down views of linear motion system 100. FIGS. 7, 8A, and 8B show the outline of table 240, but table 240 is transparent so that other components of linear motion system 100 are visible.

As shown in FIGS. 7, 8A, and 8B 8, two force stabilization components 260 and 270 may be secured to table 240 at respective locations that are opposite each other and that allow force stabilization components 260 and 270 to each mechanically interact with rails 120 and 130 respectively. In general, force stabilization components 260 and 270 may be located such that their respective interactions with respective rails 120 and 130 combine to produce a rotational force 290 (as shown in FIGS. 8A and 8B) on table 240 relative to base 110, the center of the rotation being an imaginary/virtual vertical axis that nominally runs through the center of the table 240.

FIGS. 6A-D show an exemplary force stabilization component 260. The dashed lines represent sub-components embedded inside force stabilization component 260. Securement block 267 and free block 269 may be blocks made from, e.g., aluminum, or from many other materials known in the art. Force stabilization component 260 may comprise two channels (including the necessary female threading in free block 269) sized and dimensioned for bolts 266a and 266b, and additionally comprising free movement channels 291a and 291b for the heads of bolts 266a and 266b to move freely within securement block 267 along free-movement channels 291a and 291b respectively. This configuration allows free block 269 to move closer or further from securement block 267 (as springs 264a and 264b stretch and contract and bolts 266a and 266b slide in free-movement channels 291a and 291b) inside securement block 267, so that the distance space between securement block 267 and free block 269 may increase and decrease.

FIGS. 6A and 6C illustrate bolts 266a and 266b with a bolt heads having a larger diameter than the diameter of the shafts of bolts 266a and 266b. Using a larger diameter for the bolt head is not necessary but is merely for convenience to prevent free block 269 from separating from secured block 267 when no other constraints (e.g., rails 120 or 130) prevent such separation.

Springs 264a-b may be compressions springs with a tendency to exert a force to separate securement block 267 from free block 269. The characteristics of springs 264a-b may be selected based on specific applications of this invention.

Roller 262 may be a roller secured by a threaded bolt or other mechanism to free block 267, such that roller 262 rolls when a surface in contact with contact point 263a moves along axis 263b.

Screws 268a-c may be screws for fitting into complementarily threaded holes in table 240 for securing securement block 267 to table 240.

As shown in FIG. 7, force stabilization components 260 and 270 may be secured to table 240 such that rollers 262 and 272 on force stabilization components 260 and 270 are in contact with rails 120 and 130 and springs 264 and 274 (not shown in FIGS. 7, 8A, and 8B) are compressed such that each force stabilization component 260 and 270 is anchored/secured to table 240 and, through the springs 264 and 274 and rollers 262 and 272, exerts a force on respective rails 120 and 130, thereby tend to push table 240 away from rails 120 and 130 at the locations where table 240 is secured to force stabilization components 260 and 270.

FIGS. 8A and 8B are similar to FIG. 7, except that FIGS. 8A and 8B additionally show rotational force 290 exerted on table 240 relative to base 110, which force results from the interaction between force stabilization components 260 and 270 and rails 120 and 130, respectively.

Although this disclosure focuses on springs for implementing the forces from the force stabilization components, other mechanical solutions for providing these forces may be used.

As shown in FIGS. 8A and 8B, the placement force stabilization components 260 and 270 as shown in FIGS. 7, 8A, and 8B results in rotational force 290 on table 240 relative to base 110. By properly selecting the characteristics of springs 264a-b and 274a-b, e.g., selecting spring strengths/forces that will result in stronger forces than the potential rotational forces 210 and 211 resulting from (i) non-uniform friction characteristics of the interactions between rail bearings 125 and 126 and rail 120, and the interactions between rail bearings 135 and 136 and rail 130, and/or (ii) anticipated external forces that may occur during operation of the system, this system guarantees that the direction of the net rotational force exerted on the table remains constant regardless of the direction in which table 240 is moved along rails 120 and 130.

In some embodiments, it may be possible to use only one force stabilization component 260 instead of two (or complementary) force stabilization components, 260 and 270 respectively, but the results of such an implementation will likely be inferior to the results from using two force stabilization components or a system of complementary force stabilization components to apply a net rotation force that is symmetrical about the center of rotation.

Compensating for Error from Thermal Heat Expansion

Even though the approach described above overcomes the non-repeatability problem resulting from rotational forces arising out of non-uniform friction characteristics of the rail bearings, other obstacles to accurate and precise position measurements may persist. The problems described above relating to thermal expansion may be addressed by using a low-CTE (low-coefficient-of-thermal-expansion) scale for a linear encoder. Such low-CTE scales are known and available. In one embodiment, a low-CTE linear encoder scale may be mounted to the base and the corresponding linear encoder sensor may be mounted to the table. In another embodiment, a low-CTE linear scale may be mounted to the table and the corresponding linear encoder sensor may be mounted to the base.

Determining Position

Even with rotational offset repeatability (as described above), and a low-CTE linear encoder scale compensating for thermal expansion error, true position in one- or multi-dimensions may notwithstanding not be amenable to accurate measurement for several reasons, including but not necessarily limited to: (i) the displacement (although constant and non-changing) resulting from the rotational offset is unknown and may vary depending on the position of the table (even though repeatable and predictable at each table location); (ii) imperfections in the system, e.g., slight curves or shape imperfections in the rails; and/or (iii) any other imperfection that may hinder measurement/determination of position.

Determination of true position may be determined using software motion correction. In one embodiment, a silicon wafer with printed fiducials may be used in combination with a high-resolution camera to calibrate, i.e., to generate a correction table comprising error measurements for various locations, e.g., in a grid pattern. In some embodiments, higher-order math may be used to generate a correction table. For locations between correction table grid locations, the software may interpolate error correction measurements.

For example, position error (magnitude and direction) may be measured at specific stage x-y coordinates (e.g., in a grid pattern) relative to a calibration standard fiducial and then, using a correction table comprising the grid of measured error (magnitude and direction) and interpolating as necessary, controlling stage motion to a set of true position coordinates to achieve acceptable true position tolerance throughout the entire range of stage travel.

SUMMARY/CONCLUSION

The inventive ideas disclosed herein are easily scaled and/or applied in one, two, or three dimensions. Additionally, the ideas and invention disclosed herein also apply to systems having different numbers of rails and/or rail bearings.

The ideas and inventions disclosed herein have at least several benefits: (i) use of persistent rotational force to guarantee constant rotational offset, thereby avoiding non-repeatability resulting from changing rotational forces and changing rotational offsets; (ii) use of low-CTE linear encoder scale to avoid position error inaccuracy resulting from thermal expansion; and (iii) use of software error correction (calibration wafer and correction table) to accurately measure true position. These three techniques may be used alone or in combination with each other. Using all three of these techniques together may facilitate a one- or multi-dimensional linear-motion table movement system with high accuracy and high precision, even though made from components and sub-systems that are relatively low-accuracy, low-precision, unrepeatable, and/or rudimentary.

What is claimed is:

1. A linear motion system, comprising:
 a base comprising a platform, a first rail, and a second rail, wherein the first rail and second rail are parallel to each other;

a table comprising a first rail bearing element configured to move along the first rail, and a second rail bearing element configured to move along the second rail;

a first force stabilization component secured to the table at a first securement position and configured to exert a force on the first rail to push the first rail away from the first securement position.

2. The system of claim 1, further comprising a linear actuator configured to move the table in one dimension relative to the base along the first rail and the second rail.

3. The system of claim 2, wherein the linear actuator comprises a servomotor, ball screw, and ball screw nut.

4. The system of claim 2, wherein a low-CTE linear encoder scale is mounted to the table and a corresponding linear encoder sensor is mounted to the base.

5. The system of claim 1, wherein:
the first force stabilization component comprises:
 a fixed sub-component,
 a non-fixed sub-component, and
 a force-separation sub-component; and
the fixed sub-component is secured to the table in a fixed position relative to the table;
the non-fixed sub-component is configured to move in at least one dimension relative to the table;
the force-separation component is in contact with the fixed sub-component and the non-fixed sub-component and is configured to exert a force to push the non-fixed sub-component away from the fixed sub-component; and
the non-fixed sub-component is in contact with the first rail.

6. The system of claim 5, wherein the force-separation sub-component comprises at least one spring.

7. The system of claim 6, wherein the force-separation sub-component comprises two springs.

8. The system of claim 5, wherein the fixed sub-component is configured to move relative to the non-fixed sub-component in one dimension along a shaft that is in contact with both the fixed sub-component and with the non-fixed sub-component.

9. The system of claim 5, wherein the fixed sub-component is configured to move relative to the non-fixed sub-component in one dimension along two shafts, each of which is in contact with both the fixed sub-component and with the non-fixed sub-component.

10. The system of claim 5, wherein the force stabilization component is in contact with the first rail at a first rail contact point.

11. The system of claim 10, wherein the first rail contact point is a roller.

12. The system of claim 1:
further comprising a second force stabilization component secured to the table at a second securement position and configured to exert a force on the second rail to push the second rail away from the second securement position;
wherein the first force stabilization component and the second force stabilization component are positioned on table and oriented relative to table to create a rotational force on table relative to base.

13. The system of claim 1, wherein a low-CTE linear encoder scale is mounted to the base and a corresponding linear encoder sensor is mounted to the table.

* * * * *